United States Patent
Gildert et al.

[11] Patent Number: 5,856,602
[45] Date of Patent: *Jan. 5, 1999

[54] SELECTIVE HYDROGENATION OF AROMATICS CONTAINED IN HYDROCARBON STREAMS

[75] Inventors: Gary R. Gildert; Hugh M. Putman; Dennis Hearn, all of Pasadena, Tex.

[73] Assignee: Catalytic Distillation Technologies

[*] Notice: The term of this patent shall not extend beyond the expiration date of Pat. No. 5,773,670.

[21] Appl. No.: 711,101

[22] Filed: Sep. 9, 1996

[51] Int. Cl.$^6$ .................................................. C07C 5/10
[52] U.S. Cl. .................. 585/266; 585/250; 203/DIG. 6
[58] Field of Search .................. 585/266, 258, 585/250; 206/DIG. 6

[56] References Cited

U.S. PATENT DOCUMENTS

| | | | |
|---|---|---|---|
| 2,373,501 | 4/1945 | Peterson | 260/667 |
| 3,450,784 | 6/1969 | Reilly et al. | 260/667 |
| 3,912,787 | 10/1975 | Nowack et al. | 260/667 |
| 3,931,345 | 1/1976 | Gryaznov et al. | 260/667 |
| 4,089,752 | 5/1978 | Hancock, II | 203/99 |
| 4,108,912 | 8/1978 | Takemura et al. | 260/667 |
| 4,115,462 | 9/1978 | Thelen et al. | 260/667 |
| 4,197,415 | 4/1980 | Hideyuki et al. | 583/23 |
| 4,215,011 | 7/1980 | Smith, Jr. | 252/426 |
| 4,225,418 | 9/1980 | Hilfman | 208/111 |
| 4,228,312 | 10/1980 | Noltes et al. | 585/250 |
| 4,232,177 | 11/1980 | Smith | 585/324 |
| 4,327,234 | 4/1982 | Nowack et al. | 585/267 |
| 4,409,411 | 10/1983 | Pez | 585/275 |
| 4,731,496 | 3/1988 | Hu et al. | 585/270 |
| 5,003,118 | 3/1991 | Low et al. | 585/253 |
| 5,073,236 | 12/1991 | Gelbein et al. | 203/29 |
| 5,082,990 | 1/1992 | Hsieh et al. | 585/467 |
| 5,087,780 | 2/1992 | Arganbright | 585/259 |
| 5,189,233 | 2/1993 | Larkin et al. | 585/265 |
| 5,210,333 | 5/1993 | Bellows et al. | 585/827 |
| 5,210,348 | 5/1993 | Hsieh et al. | 585/253 |
| 5,246,567 | 9/1993 | Buttke et al. | 208/49 |
| 5,254,763 | 10/1993 | Gill et al. | 585/269 |
| 5,264,641 | 11/1993 | Borghard et al. | 585/269 |
| 5,266,546 | 11/1993 | Hearn | 502/300 |
| 5,395,981 | 3/1995 | Marker | 568/697 |
| 5,431,890 | 7/1995 | Crossland et al. | 422/211 |
| 5,446,223 | 8/1995 | Smith, Jr. | 585/313 |
| 5,449,501 | 9/1995 | Luebke et al. | 422/193 |
| 5,595,634 | 1/1997 | Hearn et al. | 203/29 |
| 5,628,880 | 5/1997 | Hearn et al. | 203/29 |
| 5,629,451 | 5/1997 | Hearn et al. | 564/490 |

FOREIGN PATENT DOCUMENTS 0522070 7/1993 European Pat. Off. .

*Primary Examiner*—Bekir L. Yildirim
*Attorney, Agent, or Firm*—Kenneth H. Johnson

[57] ABSTRACT

A process for the hydrogenation of a selected aromatic, such as benzene contained in a naphtha stream to cyclohexane wherein the distillation column reactor is operated such that the portion of the naphtha containing the benzene is maintained in the catalyst bed such that essentially only benzene is hydrogenated. The reactor is operated at a pressure wherein the reaction mixture is boiling under low hydrogen partial pressure in the range of about 0.1 psi to less than 70 psia at 0 to 350 psig. The catalyst is provided as a catalytic distillation structure such that the reaction is concurrently occurring with a distillation. A portion of the overheads is returned as reflux to provide cooling within the catalyst bed and concurrent condensation of some of the gaseous material within the bed.

24 Claims, 1 Drawing Sheet

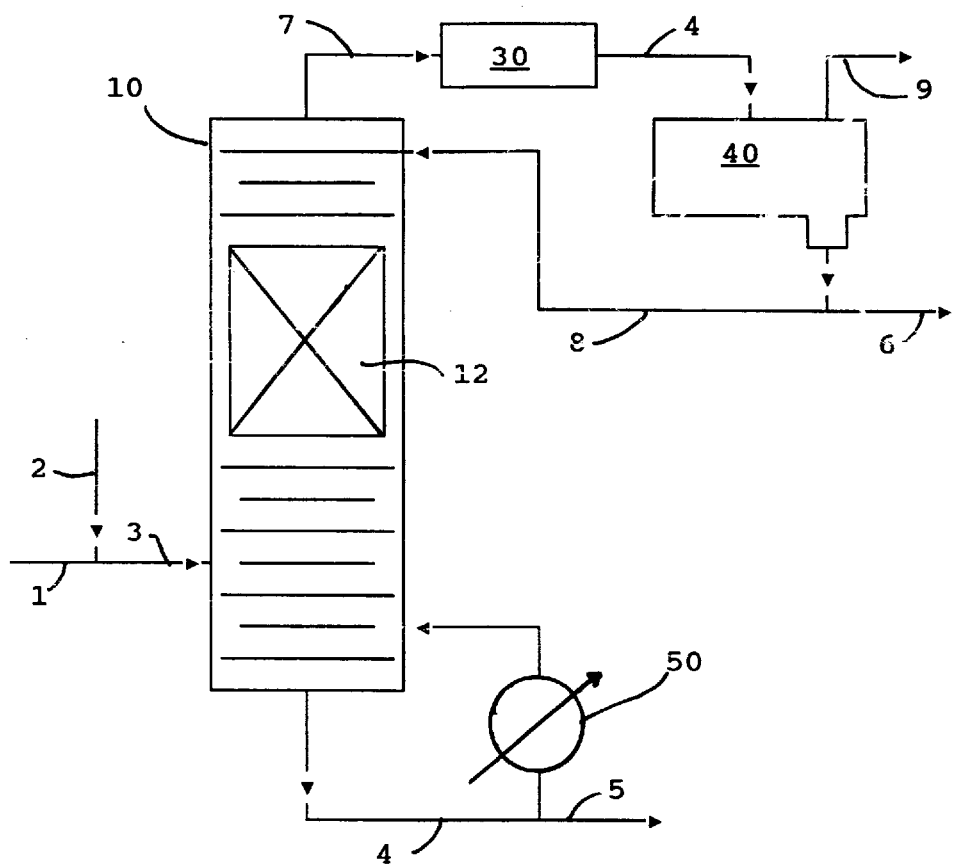

SELECTIVE HYDROGENATION OF AROMATICS CONTAINED IN HYDROCARBON STREAMS

BACKGROUND OF THE INVENTION

1. Field of the Invention

The present invention relates to the selective hydrogenation of benzene in a stream, such as naphtha to make cyclohexane and reduce the benzene content. More particularly the invention relates to a process wherein the hydrogenation of the benzene and separation of the cyclohexane product by distillation is carried out simultaneously in a distillation column reactor. More particularly the invention relates to a process wherein the benzene is contained in a light naphtha stream from a cracking process or from a catalytic reformer wherein the stream also contains toluene. Most particularly the invention relates to a process for the hydrogenation of the benzene contained in a light naphtha stream with very little hydrogenation of the toluene or other aromatics.

2. Related Information

The reduction in the lead content of gasolines and the ban on use of lead anti-knock compounds have lead to a search for other ways to improve the octane number of blending components for gasoline. The alternatives to uses of lead anti-knock compounds are chemical processing and the use of other additives.

One common process long used by the refinery industry to upgrade raw naphtha to high octane gasoline is catalytic reforming. In catalytic reforming the raw naphtha having a boiling range of circa 115°–350° F. is passed over an alumina supported noble metal catalyst at elevated temperatures (circa 920°–950° F.) and moderate pressure (circa 200–550 psig). The catalyst "reforms" the molecular structures of the hydrocarbons contained in the raw naphtha by removing hydrogen and rearranging the structure of the molecules so as to improve the octane number of the naphtha. However, the increase in octane number also reduces the liquid volume of the naphtha as the specific gravity is increased.

Because of the multiplicity of the compounds in the raw naphtha, the actual reactions which occur in catalytic reforming are numerous. However, some of the many resulting products are aryl or aromatic compounds, all of which exhibit high octane numbers. The aryl compounds produced depend upon the starting materials which in a refinery are controlled by the boiling range of the naphtha used and the crude oil source. The "reformed" product from a catalytic reforming process is commonly called reformate and is often separated into two fractions by conventional distillations—a light reformate having a boiling range of circa 115°–250° F. and a heavy reformate having a boiling range of circa 250°–350° F. The aryl compounds in each fraction are thus dependent upon their boiling points. The lower boiling or lighter aryl compounds, e.g., benzene, toluene and xylenes, are contained in the light reformate and higher boiling aryl compounds are contained in the heavy reformate.

The light reformate is that portion formulated into gasoline. Until the EPA mandate requiring an elimination of most benzene from gasoline (general requirements for reformulated gasoline specify a maximum of 1.0 vol. % benzene) this was a solution to the elimination of lead. Now benzene must be removed or converted to more benign components, while maintaining the octane of the gasoline. One effective means to achieve this is to alkylate the benzene, however the olefin streams for this purpose may be expensive or otherwise employed.

Hydrogenation of the benzene is an alternative for removing that aromatic compound from gasoline streams. One example of this process is disclosed by Hsieh, et al in U.S. Pat. No. 5,210,348 wherein hydrogenation of the benzene fraction is used alone or in combination with alkylation.

Peterson in U.S. Pat. No. 2,373,501 discloses a liquid phase process for the hydrogenation of benzene to cyclohexane wherein a temperature differential is maintained between the top of the catalyst bed where benzene is fed and the outlet where substantially pure cyclohexane is withdrawn. The temperature differential is due to the change in the exothermic heat of reaction released as less and less benzene is converted as the concentration of benzene decreases. Hydrogen is supplied counter current to the benzene/cyclohexane flow. Temperature control coils are disposed within the reactor to maintain the temperature differential if the exothermic heat of reaction is not sufficient or to cool the bed if too much heat is released. Peterson recognizes that although the bulk of his reaction takes place in the liquid phase a portion of the benzene and cyclohexane will be vaporized, especially near the top of the reactor where the benzene concentration is highest and conversion is highest. A reflux condenser is provided to condense the condensible material and return it to the reactor. Thus a substantial portion of the heat of reaction is removed by condensation of the reactants vaporized throughout the reaction.

Larkin, et al. in U.S. Pat. No. 5,189,233 disclose another liquid phase process for the hydrogenation of benzene to cyclohexane. However, Larkin, et al utilize high pressure (2500 psig) to maintain the reactants in the liquid state. In addition Larkin, et al disclose the use of progressively more active catalyst as the concentration of benzene decreases to control the temperature and unwanted side reactions.

Hui, et al. in U.S. Pat. No. 4,731,496 disclose a gas phase process for the hydrogenation of benzene to cyclohexane over a specific catalyst. The catalyst reported therein is nickel supported on a mixture of titanium dioxide and zirconium dioxide.

The plug flow or single pass reactor for the hydrogenation of benzene in a naphtha stream has as a drawback the problem of indiscriminate hydrogenation of all the aromatic compounds which can contribute to the improved octane.

SUMMARY OF THE INVENTION

The present invention comprises a process for hydrogenating selected aromatic compounds, for example benzene, contained in a mixed hydrocarbon stream, comprising: (a) feeding a hydrocarbon stream containing a plurality of aromatic compounds to a distillation column reactor into a feed zone; (b) feeding a gas stream containing hydrogen into said feed zone; and (c) concurrently: (1) contacting said mixed hydrocarbon stream and said gas stream with a fixed bed hydrogenation catalytic distillation structure in a distillation reaction zone under hydrogenation conditions; and (2) fractionating said reaction mixture to: (i) maintain a selected fraction comprising at least one and less than all of said aromatic compounds in the distillation reaction zone to selectively react at least a portion thereof with said hydrogen to form a reaction mixture containing saturated ring compounds, unreacted hydrogen and unreacted aromatic compounds and (ii) separate the resultant saturated ring compounds from unreacted aromatic compounds.

The hydrogen stream is at an effective hydrogen partial pressure of at least about 0.1 psia to less than 70 psia, preferably less than 50 psia in the range of 2 to 25 psia.

In the process to remove benzene the benzene containing stream and hydrogen are fed to a distillation column reactor containing a hydrogenation catalyst which is a component of a distillation structure and operating the distillation column reactor such that the benzene is maintained in the catalyst bed to hydrogenate substantially all of the benzene.

BRIEF DESCRIPTION OF THE DRAWING

FIG. 1 is a flow diagram of one embodiment of the invention.

DETAILED DESCRIPTION OF THE INVENTION

The catalytic material employed in the hydrogenation process is in a form to serve as distillation packing. Broadly stated, the catalytic material is a component of a distillation system functioning as both a catalyst and distillation packing, i.e., a packing for a distillation column having both a distillation function and a catalytic function. The catalyst is prepared in the form of a catalytic distillation structure. More particularly the hydrogenation catalyst is generally a metal supported on an alumina carrier in the form of extrudates or spheres. The extrudates or spheres are placed in porous containers and suitably supported in the distillation column reactor to allow vapor flow through the bed, yet provide a sufficient surface area for catalytic contact.

Among the metals known to catalyze the hydrogenation reaction are platinum, rhenium, cobalt, molybdenum, nickel, tungsten and palladium. Generally, commercial forms of catalyst use supported oxides of these metals. The oxide is reduced to the active form either prior to use with a reducing agent or during use by the hydrogen in the feed. These metals also catalyze other reactions, most notably dehydrogenation at elevated temperatures.

To provide the desired degree of temperature and residence time control a process and apparatus are provided wherein the reaction liquid is boiling within a distillation column reactor. Overheads are withdrawn and condensed with some of the condensate being returned to the distillation column reactor as reflux. The advantage of the present process is that due to the continual reflux a portion of the selected aromatic is always condensing on the catalyst structure.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the selected aromatic, e.g. benzene, in the presence of the catalyst to result in their hydrogenation. Additionally, the vaporization of the liquid feed removes a substantial amount of the exothermic heat of reaction. Since the liquid is at the boiling point in the reactor, the temperature may be controlled by the pressure. An increase in pressure increases the temperature and a decrease in pressure decreases the temperature.

The reaction system can be described as heterogenous since the catalyst remains a distinct entity. Any suitable hydrogenation catalyst may be used, for example Group VIII metals of the Periodic Table of Elements as the principal catalytic component, alone or with promoters and modifiers such as palladium/gold, palladium/silver, cobalt/zirconium, nickel preferably deposited on a support such as alumina, fire brick, pumice, carbon, silica, resin or the like.

A preferred catalyst structure for the hydrogenation of benzene comprises at least one plurality of flexible, semi-rigid open mesh tubular elements filed with a particulate catalytic material (catalyst component) and sealed at both ends, intimately associated with and supported by a wire mesh screen coiled into a spiral having a longitudinal axis, said tubular element being arrayed at an angle to the longitudinal axis thereby forming a bale and is described in detail in U.S. Pat. No. 5,431,890 incorporated herein.

The flexible, semi-rigid open mesh tubular element filled with a particulate catalytic material preferably has a fastener every 1–20 inches along the length of the tube to form a multiple link shaped catalytic distillation structure. The links formed by the fasteners may be evenly or irregularly spaced.

The bale shaped catalytic distillation structures are formed by placing at least one tubular element on top of the wire mesh screen, such as demister wire, in a diagonal array, such that when the wire mesh screen is rolled up, the rolled structure provides a new and improved catalytic distillation structure. Further embodiments include multiple stack arrangements of alternating wire screen mesh and tubular elements that are rolled into a new bale shaped catalytic distillation structure. The tubular elements on alternating layers are preferably arrayed on the wire mesh screen in opposite directions such that their paths cross. Each tubular element will define a spiral within the bale.

The catalyst component may take several forms. In the case of particulate catalytic material, generally from 60 mm to about 1 mm down through powders, is enclosed in a porous container such as screen wire, or polymeric mesh. The material used to make the container must be inert to the reactants and conditions in the reaction system. The screen wire may be aluminum, steel, stainless steel, and the like. The polymer mesh may be nylon, teflon, or the like. The mesh or threads per inch of the material used to make the container is such that the catalyst is retained therein and will not pass through the openings in the material. Although the catalyst particles of about 0.15 mm size or powders may be used and particles up to about ¼ inch diameter may be employed in the containers.

A typical benzene containing naphtha is a light reformate having the following characteristics:

TABLE I

Typical Light Reformate Analysis

| Component | wt. % |
|---|---|
| $C_3$ to $C_8$ non aromatics | 55.5 |
| Benzene | 9.5 |
| Toluene | 32.5 |
| Ethylbenzene + Xylenes | 2.0 |
| $C_9$ aromatics | 0.2 |
| $C_{10}$ aromatics | 0.2 |
| $C_{11}$ aromatics | 0.2 |

While it will be appreciated that the light reformate analysis is dependent upon the composition of the raw naphtha, all light reformates contain some of the aryl compounds shown above to a greater or lesser extent.

The mole ratio of hydrogen to benzene fed to the distillation column reactor is preferably between 2:1 and 41:1.

The hydrogenation of benzene is an exothermic reaction. In the past the temperature has been controlled by quench at strategic points within a reactor by addition of cool hydrogen. The addition of the hydrogen also acted to maintain a molar excess of hydrogen within the reactor to prevent coking and other undesirable side reactions. It is believed that in the present reaction catalytic distillation is a benefit first, because the reaction is occurring concurrently with distillation, the initial reaction products and other stream components are removed from the reaction zone as quickly as possible reducing the likelihood of side reactions. Second, because all the components are boiling the temperature of reaction is controlled by the boiling point of the mixture at the system pressure. The heat of reaction simply creates more boil up, but no increase in temperature at a given pressure.

Essentially the distillation column reactor is operated as a splitter with the $C_6$ and lighter material going overhead and the $C_7$ and heavier going out as bottoms. In the current process the temperature is controlled by operating the reactor at a given pressure to allow partial vaporization of the reaction mixture. The exothermic heat of reaction is thus dissipated by the latent heat of vaporization of the mixture. The vaporized portion is taken as overheads and the condensible material condensed and returned to the column as reflux.

The downward flowing liquid causes additional condensation within the reactor as is normal in any distillation. The contact of the condensing liquid within the column provides excellent mass transfer for dissolving the hydrogen within the reaction liquid and concurrent transfer of the reaction mixture to the catalytic sites. It is thought that this condensing mode of operation results in the excellent conversion and selectivity of the instant process and allows operations at the lower hydrogen partial pressures and reactor temperatures noted. A further benefit that this reaction may gain from catalytic distillation is the washing effect that the internal reflux provides to the catalyst thereby reducing polymer build up and coking. Internal reflux may vary over the range of 0.2 to 20 L/D (wt. liquid just below the catalyst bed/wt. distillate) which gives excellent results.

A particularly unexpected benefit of the present process centers on the combined reaction distillation going on in the column. The reformate comprises a mixture of organic aromatic compounds boiling over a range. The product from the hydrogenation can be tailored by adjusting the temperature in the column to fractionate the reformate feed concurrently with the reaction of hydrogen and aromatic compound and the distillation of the hydrogenation product. Any cut can be made that is within the capacity of the equipment. For example the light end of the reformate along with the cyclohexane can be taken overhead, heavies such as toluene taken as bottoms and a high concentration of benzene maintained in the portion of the column containing the catalytic distillation structure. The location of the catalyst bed can also be tailored for optimum results.

The present invention carries out the method in a catalyst packed column which can be appreciated to contain a vapor phase and some liquid phase as in any distillation. The distillation column reactor is operated at a pressure such that the reaction mixture is boiling in the bed of catalyst. The present process operates at overhead pressure of said distillation column reactor in the range between 0 and 350 psig, preferably 250 or less suitable 35 to 120 psig and temperatures in said distillation reaction bottoms zone in the range of 100° to 500° F., preferably 150° to 400° F., e. g. 212° to 374° F. at the requisite hydrogen partial pressures.

The feed weight hourly space velocity (WHSV), which is herein understood to mean the unit weight of feed per hour entering the reaction distillation column per unit weight of catalyst in the catalytic distillation structures, may vary over a very wide range within the other condition perimeters, e.g. 0.1 to 35.

In order to maintain benzene in a light naphtha reformate within the catalyst bed, for example, the pressure can be at 75 psig to maintain a overhead temperature of about 275° F., mid reflux of about 300° F. and a bottoms temperature of about 400° F. The temperature in the catalyst bed would be around 270° F. The hydrogenation is primarily carried out with the benzene to produce a gasoline component of desirable properties (a bottoms product containing toluene), which can then be recombined with the other components of the reformate. The overheads can be condensed and fractionated to recover the cyclohexane. This is not possible with a straight pass hydrogenation of the same components, where the resulting product would not be a discernible improvement, because there is an indiscriminate hydrogenation of the aromatic components in the reformate.

Referring now to the FIG. there is shown a flow diagram of one embodiment of the invention. The light naphtha containing benzene is fed via line 1 and hydrogen via line 2 both being combined in line 3 which feeds the hydrogen and naphtha below the catalytic distillation structure 12 contained in distillation column reactor 10. Heat necessary for start up and to balance the process is provided by circulating the bottoms stream 4 through reboiler 50 and return line 5. The benzene is boiled up into the bed where it reacts with hydrogen to form a reaction mixture containing the reaction product cyclohexane, toluene, xylenes and inerts. The exothermic heat of reaction causes more boil up of the reaction mixture with the vaporized portion leaving the column as overheads via flow line 7. Unreacted hydrogen also exits with the overheads. The gaseous overheads containing cyclohexane, inerts and hydrogen are passed through condenser 30 where substantially all of the $C_6-$ and cyclohexane are condensed. The overheads stream is then passed to receiver/separator 40 where the gas which is mostly hydrogen is separated and the liquid collected. The gas is removed via line 9 for recycle or use later in the process.

A portion of the condensed liquid is returned to the distillation column as reflux via flow line 8 where it provides additional cooling and condensing within the column. Overhead products are taken via flow line 6. The bottoms, containing toluene and $C_7+$ material, are removed via flow line 4 with a portion being recirculated through reboiler 50 and flow line 5. Both the $C_7+$ fraction and the $C_5-$ fraction are kept separate so that optimum blending can be obtained.

The present process allows for the use of much lower hydrogen partial pressures and somewhat lower temperatures than normal processes.

In the following examples the overhead pressure was set as desired and the reboiler was charged with cyclohexane and heat added. When the desired top to bottom temperature differential was obtained the liquid feed rate was established and hydrogen flow started. After a level was noted in the overhead receiver cyclohexane flow was stopped and the unit operated at total reflux for two hours before the reformate feed was started. Overheads liquids product draw was set to balance the column.

EXAMPLE 1 [Run 259BzH2]

477 grams of Crosfield HTC-400 $\frac{1}{32}$ inch extrudate alumina supported nickel (20 wt % Ni) catalyst were loaded into the tubular elements and wound into a bale as previously described and placed into 20 feet of a 28 foot, 1 inch ID distillation column reactor with 2 feet of open space below and 4.5 feet of open space above the catalyst bed. Conditions and results are shown in Table II below. In this example a toluene free light reformate (essentially a $C_5-C_6$ fraction) was used as feed so no bottoms were taken.

TABLE II

| Time on stream, hrs | 393 |
|---|---|
| Pressure, psig | 75 |
| Catalyst Temp. °F. | 263 |
| Internal Reflux Ratio | 3.2 |
| Feed Rate, lbs/hr liq. | 3.0 |
| $H_2$ Rate scfh, gas | 18.0 |
| $H_2$/Bz mole ratio | 3.65 |
| Pressure Drop psi | 0.21 |

| Analysis, | FEED | OVERHEAD | BOTTOMS |
|---|---|---|---|
| Cyclohexane, wt % | 0.22 | 22.48 | |
| Benzene, wt % | 33.82 | 0.52 | |
| Flow rate, lb/hr | 3.00 | 2.88 | 0.01 |

98.5% of the benzene in the feed was converted.

EXAMPLE 2 [Run 1020BzH2]

Fifteen pounds of Calcicat E-475-SR spherical (8×14 mesh) alumina supported nickel (54 wt % Ni) catalyst were loaded into the tubular elements and wound into a bale as previously described and placed into the bottom 30 feet of a 50 foot tall 3" diameter distillation column reactor. A light reformate having 5.35 wt % benzene and 21.16 wt % toluene was used as feed to the unit. Conditions and results are shown in Table III below.

TABLE III

| CONDITIONS | |
|---|---|
| Time on stream, hrs | 276 |
| Pressure, psig | 75 |
| Catalyst Temp. °F. | 260–280 |
| Top Temp., °F. | 275 |
| Bottoms Temp., °F. | 368 |
| Internal Reflux Ratio | 2.9 |
| Feed Rate, lbs/hr liq. | 144.0 |
| Bottoms Rate, lbs/hr liq. | 119.0 |
| Distillate Rate, lbs/hr | 23.5 |
| Vent Rate, lbs/hr | 2.5 |
| $H_2$ Rate scfh, gas | 220.0 |
| $H_2$/Bz mole ratio | 4.85 |
| $H_2$ PP, psi | 28.3 |

| ANALYSIS, WT % | FEED | OVERHEAD | BOTTOMS |
|---|---|---|---|
| Cyclohexane | 0.43 | 20.88 | 1.75 |
| Benzene | 5.35 | 4.04 | 0.00 |
| Toluene | 21.16 | 0.00 | 28.05 |
| Benzene Conversion | 87.9% | | |

The invention claimed is:

1. A process for hydrogenating selected aromatic compounds contained in a hydrocarbon stream, comprising:
   (a) feeding a mixed hydrocarbon stream containing a plurality of aromatic compounds to a distillation column reactor into a feed zone;
   (b) feeding a gas stream containing hydrogen into said feed zone; and
   (c) concurrently in said distillation column reactor:
      (1) contacting said mixed hydrocarbon stream and said gas stream with a fixed bed hydrogenation catalyst in a reaction zone under hydrogenation conditions to form a reaction mixture; and
      (2) fractionating said reaction mixture to:
         (i) maintain a selected fraction comprising at least one and less than all of said aromatic compounds in the reaction zone to selectively react at least a portion thereof with said hydrogen to form a reaction mixture containing saturated ring compounds, unreacted hydrogen and unreacted aromatic compounds and
         (ii) separate the resultant saturated ring compounds from unreacted aromatic compounds.

2. The process according to claim 1 wherein the overhead pressure of the distillation column reactor is between 10 and 120 psig.

3. The process according to claim 2 wherein the bottoms temperature of the distillation column reactor is between 212° and 450° F.

4. The process according to claim 1 wherein the hydrogen partial pressure is less than 70 psia.

5. The process according to claim 1 wherein the hydrogen partial pressure is between 0.1 and 50 psi.

6. The process according to claim 1 wherein the hydrogen partial pressure is between 2 and 30 psia.

7. The process according to claim 1 wherein the overhead pressure is between 0 and 350 psig.

8. The process according to claim 1 wherein said reaction and distillation are carried out concurrently in a reaction distillation zone and said catalyst comprises a distillation structure.

9. The process of claim 8 wherein said hydrocarbon stream comprises benzene.

10. The process of claim 9 wherein a fraction of said hydrocarbon stream having a boiling point corresponding to benzene is maintained in said distillation reaction zone.

11. The process of claim 10 wherein a lower boiling fraction of said hydrocarbon stream is removed from said distillation column reactor as overheads and a higher boiling fraction of said hydrocarbon stream is removed as bottoms from said distillation reactor column.

12. The process according to claim 8 wherein said catalytic distillation structure comprises a first plurality of flexible, semi-rigid open mesh tubular elements filled with a particulate hydrogenation catalytic material, sealed at both ends, intimately associated with and supported by a wire mesh screen coiled into a spiral having a longitudinal axis, said tubular elements being arrayed at an angle to the longitudinal axis.

13. A process for the hydrogenation of benzene contained in a full boiling range naphtha stream comprising the steps of:
   (a) feeding a full boiling range $C_5$–$C_8$ naphtha stream containing benzene, toluene and xylenes to a distillation column reactor into a feed zone;
   (b) feeding a gas stream containing hydrogen into said feed zone; and
   (c) concurrently in a distillation reaction zone:
      (1) contacting said full boiling range naphtha stream and said gas stream with a fixed bed hydrogenation catalytic distillation structure in said distillation reaction zone under hydrogenation conditions to form a reaction mixture; and
      (2) fractionating said reaction mixture to:
         (i) maintain a fraction comprising benzene contained in said full boiling range naphtha stream in the distillation reaction zone to selectively react at least a portion of said benzene with said hydrogen to form a reaction mixture containing cyclohexane, unreacted benzene, unreacted hydrogen, unreacted toluene and unreacted xylenes and
         (ii) separating the resultant cyclohexane and benzene from unreacted toluene and xylenes;

(d) withdrawing a $C_7$ and heavier stream containing the unreacted toluene and xylenes from the distillation column reactor as bottoms;

(e) withdrawing a $C_6$ and lighter stream containing cyclohexane from distillation column reactor as overheads;

(f) condensing the $C_5$ and heavier compounds in said overheads and separating any unreacted gas from said overheads; and (g) returning a portion of said condensed overheads to said distillation column reactor as reflux.

14. The process according to claim 13 wherein essentially no toluene or xylenes are hydrogenated.

15. The process according to claim 13 wherein the overhead pressure of the distillation column reactor is between 10 and 120 psig.

16. The process according to claim 15 wherein the bottoms temperature of the distillation column reactor is between 212° and 450° F.

17. The process according to claim 13 wherein the hydrogen partial pressure is less than 70 psia.

18. The process according to claim 17 wherein the hydrogen partial pressure is between 0.1 and 50 psi.

19. The process according to claim 18 wherein the hydrogen partial pressure is between 2 and 30 psia.

20. The process according to claim 13 wherein the overhead pressure is between 0 and 350 psig.

21. The process according to claim 13 wherein said catalytic distillation structure comprises a first plurality of flexible, semi-rigid open mesh tubular elements filled with a particulate hydrogenation catalytic material, sealed at both ends, intimately associated with and supported by a wire mesh screen coiled into a spiral having a longitudinal axis, said tubular elements being arrayed at an angle to the longitudinal axis.

22. In a process for hydrogenating selected aromatic compounds contained in a hydrocarbon stream, comprising:

(a) feeding a mixed hydrocarbon stream containing a plurality of aromatic compounds to a distillation column reactor into a feed zone;

(b) feeding a gas stream containing hydrogen into said feed zone; and (c) concurrently in said distillation column reactor:

(1) contacting said mixed hydrocarbon stream and said gas stream with a fixed bed hydrogenation catalyst in a reaction zone under hydrogenation conditions to form a reaction mixture; and (2) fractionating said reaction mixture to separate the resultant saturated ring compounds from unreacted aromatic compounds wherein the improvement comprises maintaining a selected fraction comprising at least one and less than all of said aromatic compounds in the reaction zone to selectively react at least a portion thereof with said hydrogen to form a reaction mixture containing saturated ring compounds, unreacted hydrogen and unreacted aromatic compounds.

23. The process according to claim 22 wherein said reaction and distillation are carried out concurrently in a reaction distillation zone and said catalyst comprises a distillation structure.

24. In a process for the hydrogenation of benzene contained in a full boiling range naphtha stream comprising the steps of:

(a) feeding a full boiling range $C_5$–$C_8$ naphtha stream containing benzene, toluene and xylenes to a distillation column reactor into a feed zone;

(b) feeding a gas stream containing hydrogen into said feed zone; and (c) concurrently in a distillation reaction zone:

(1) contacting said full boiling range naphtha stream and said gas stream with a fixed bed hydrogenation catalytic distillation structure in said distillation reaction zone under hydrogenation conditions to form a reaction mixture; and (2) fractionating said reaction mixture to separate the resultant cyclohexane and benzene from unreacted toluene and xylenes;

(d) withdrawing a $C_7$ and heavier stream containing the unreacted toluene and xylenes from the distillation column reactor as bottoms;

(e) withdrawing a $C_6$ and lighter stream containing cyclohexane from distillation column reactor as overheads;

(f) condensing the $C_5$ and heavier compounds in said overheads and separating any unreacted gas from said overheads; and (g) returning a portion of said condensed overheads to said distillation column reactor as reflux wherein the improvement comprises maintaining a fraction comprising benzene contained in said full boiling range naphtha stream in the distillation reaction zone to selectively react at least a portion of said benzene with said hydrogen to form a reaction mixture containing cyclohexane, unreacted benzene, unreacted hydrogen, unreacted toluene and unreacted xylenes.

* * * * *